United States Patent
Bhagavatula et al.

(10) Patent No.: US 6,317,536 B1
(45) Date of Patent: Nov. 13, 2001

(54) PHASED FIBER ARRAY FOR MULTIPLEXING AND DEMULTIPLEXING

(75) Inventors: Venekata A. Bhagavatula, Big Flats; Daniel A. Nolan, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/445,648

(22) PCT Filed: Jun. 5, 1998

(86) PCT No.: PCT/US98/11733

§ 371 Date: Dec. 10, 1999

§ 102(e) Date: Dec. 10, 1999

(87) PCT Pub. No.: WO98/58283

PCT Pub. Date: Dec. 23, 1998

Related U.S. Application Data
(60) Provisional application No. 60/050,120, filed on Jun. 18, 1997.

(51) Int. Cl.[7] .............................. G02B 6/28; H04J 14/00
(52) U.S. Cl. .................... 385/24; 385/15; 385/16; 385/17; 385/43; 385/14; 385/129; 385/130; 359/115; 359/117; 359/124; 359/127; 359/128
(58) Field of Search .................... 385/14, 24, 37, 385/15, 16, 17, 129, 130, 131, 43, 3; 359/115, 124, 117, 127, 128

(56) References Cited

U.S. PATENT DOCUMENTS

| | | | |
|---|---|---|---|
| 4,974,941 | 12/1990 | Gibbons et al. | 252/299.4 X |
| 5,032,009 | 7/1991 | Gibbons et al. | 252/299.4 X |
| 5,351,325 | * 9/1994 | Miller et al. | 385/42 |
| 5,807,498 | 9/1998 | Gibbons et al. | 252/299.4 X |
| 6,034,800 | * 3/2000 | Asahi | 359/128 |
| 6,049,640 | * 4/2000 | Doerr | 385/15 |
| 6,141,467 | * 10/2000 | Doerr | 385/24 |

FOREIGN PATENT DOCUMENTS

| | | | |
|---|---|---|---|
| 0742471 | 5/1996 | (EP) | 359/253 X |
| 0717295-A2 | * 6/1996 | (EP) | 385/24 X |
| 0717295-A3 | * 6/1996 | (EP) | 385/24 X |

OTHER PUBLICATIONS

Okamoto et. al. "Fabrication of variable bandwidth Filters . . . " Electronics Lett. Aug. 1995 vol. 31, No. 18 pp. 1592–1594.*

Doerr et al., "Chromatic Focal Plane Displacement . . . " IEEE Photonics Tech. Lett. vol. 9, No. 4, May 1997, pp. 625–627.*

* cited by examiner

Primary Examiner—Brian Healy
(74) Attorney, Agent, or Firm—William J. Chervenak

(57) ABSTRACT

A reduced size multiplexer/demultiplexer component is achieved by tapering of waveguide ends in any of the input, output array, or phase shifting array of waveguides. Cross talk is limited in the tapered region by requiring that each waveguide in a tapered array have a distinct propagation constant.

16 Claims, 2 Drawing Sheets

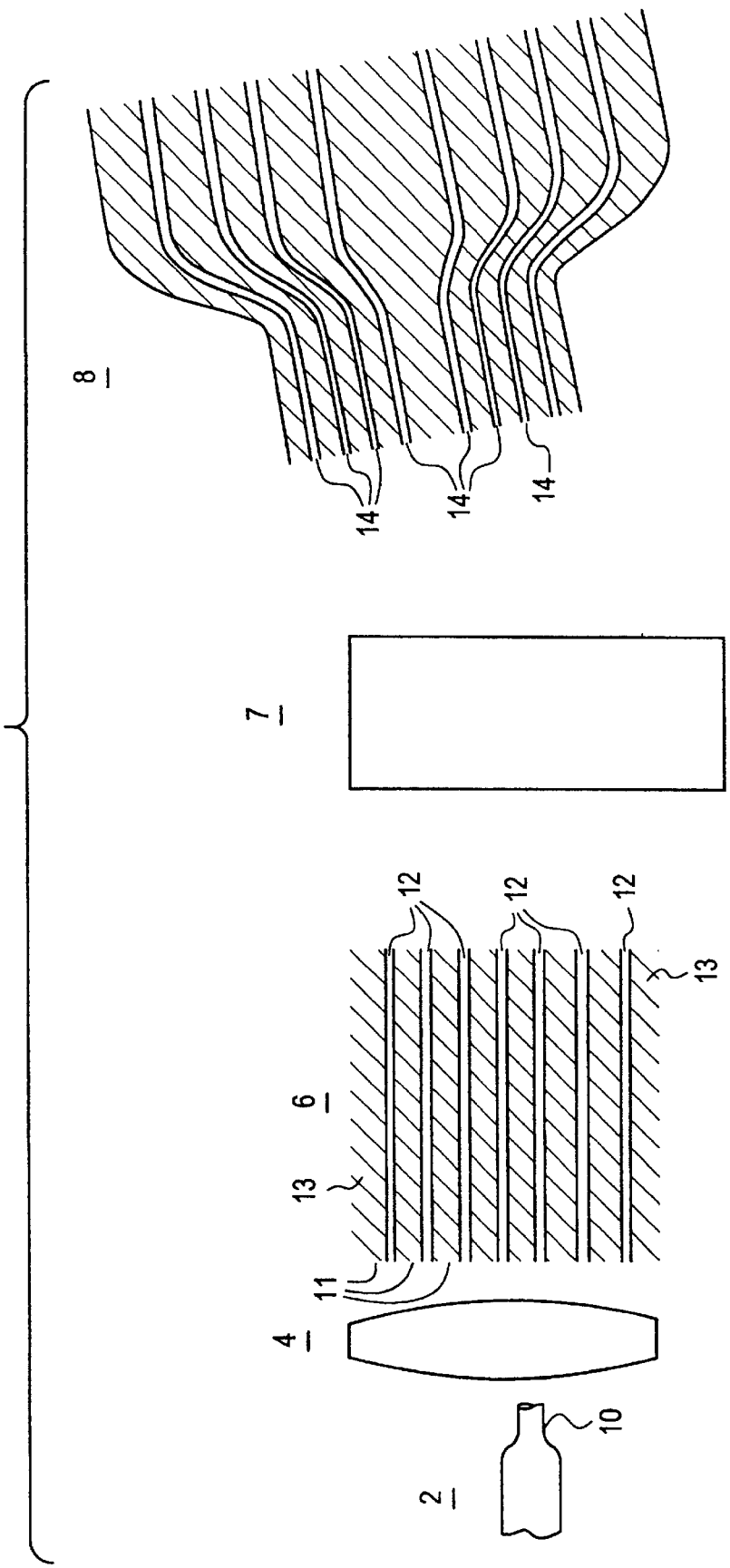

PHASED FIBER ARRAY FOR MULTIPLEXING AND DEMULTIPLEXING

This appln. is a 371 of PCT/US98/11733 filed Jun. 5, 1993 claims benefit of Prov. No. 60/050,120 filed Jun. 18, 1997.

BACKGROUND OF THE INVENTION

The invention is directed to a phased array of optical waveguides for wavelength division multiplexing and demultiplexing of optical signals. In particular, the novel optical waveguide multiplexer/demultiplexer includes an array of waveguides which are configured to efficiently collect light from the phased array, at a spatial location relatively close to the phased array, while minimizing coupling among the waveguides of the output array.

Wavelength division multiplexing and demultiplexing (WDMD) have gained in importance as system data rate and system capacity requirements have increased. Usually, the two types of signal processing, i.e., multiplexing and demultiplexing are discussed together because many embodiments of WDMD devices are reciprocal. That is, multiplexed signals which are transmitted through a WDMD device in a first direction are separated into component wavelengths, each propagating in a pre-selected one waveguide. Alternatively, signals of different wavelengths propagating in separate waveguides are multiplexed when transmitted through the device in a direction opposite the first direction. This reciprocity of function is found in the devices disclosed and described herein. Thus it will be understood throughout this document that a discussion of the multiplexing function includes the reciprocal demultiplexing function. Choosing one or the other function for discussion removes the need for discussion of its obvious reciprocal, thus simplifying the description without sacrificing completeness.

The parts or segments of a WDMD device typically include a phase shifting array of waveguides which can sort signals by wavelength, one or more waveguides for transmitting or receiving multiplexed signals, and a waveguide array for transmitting or receiving a plurality of demultiplexed signals. The transmitting or receiving segments must be properly coupled to the phase shifting array. In particular, the one or more waveguides which launch multiplexed signals into the phase shifting array must be so coupled to the phase shifting array as to uniformly distribute signal intensity onto the ends of the waveguides of the array. It is understood that the intensity of the light in a plane does have some variation. In this context, the term uniform means that the shape the intensity distribution of light may have is not such that unacceptable crosstalk appears in the multiplexed or demultiplexed signals. In addition, proper demultiplexing of signals occurs when light intensity from each of the waveguides of the phase shifting array is distributed uniformly onto each waveguide of the array which propagates a demultiplexed signal. The multiplexing and demultiplexing functions may be described using a different conceptual model. For example, one may speak of the wavefront exiting the phase shifting array as being tilted at an angle which provides for constructive interference of the phase shifted light. A different tilt angle corresponds to different light wavelengths. The results, i.e., the structure of a WDMD is, of course, not effected by the choice of descriptive model. The alternative description is mentioned here to avoid confusion between this application and other publications or previously filed applications.

The characteristics of a satisfactory WDMD device are:

minimum signal attenuation within the device;

separation of signals by wavelength sufficient to meet a pre-selected bit error rate ceiling;

small size; and, ease of manufacture which can translate into lower cost. A particular one of these characteristics may gain in importance depending upon the requirements of the system in which the device is used.

There is a strong need within the telecommunications industry for WDMD designs which provide adequate signal separation and low signal attenuation in a device which is relatively small in size and simple to manufacture. U.S. patent application Ser. No. 08/586,134, filed Jan. 11, 1996, discloses a WDMD device which simplifies the spatial configuration of the phase shifting array. The phase shifting function is performed by an array of waveguides each of which has a unique propagation constant, thus eliminating the need for a process in which the waveguides are arranged in a pattern which allows the waveguides to have unique lengths. Because adjacent waveguides of the phase shifting array have different propagation constants, cross talk among the waveguides of the array is small and thus a source of error is removed from the WDMD. Stated differently, because neighboring waveguides have different propagation constants, there is no need to adjust the geometry of the waveguides at their input or output ends to avoid cross talk error. In particular, the spacing between neighboring waveguides in the phase shifting array may be brought closer together, reducing the dimensions of the WDMD without effecting performance.

The novel work disclosed herein is an additional step toward decreasing WDMD component size without negatively effecting either waveguide cross talk or signal attenuation in the device.

DEFINITIONS

Waveguide—An elongated structure for containing and transmitting light signals, the structure made of materials which are substantially transparent to light signals. To contain and transmit light a generally central portion of the structure has a maximum index of refraction greater than the maximum index of refraction of a layer which surrounds and is in contact with at least a part of the central portion.

Refractive index profile—The central portion of the waveguide and sometimes the surrounding layer may be characterized by the index of refraction which occurs at points along a reference line in the waveguide. The reference is typically a diameter in the case of a circular waveguide or a side to side dimension for waveguides of general geometric shape.

Refractive index $\Delta\%$—A waveguide region having a maximum refractive index $n_1$ has a $\Delta\%$ relative to another region of the waveguide having a maximum refractive index $n_c$ defined by the relation $\Delta\% = (n_1^2 - n_c^2)/2n_1^2$. The region having maximum index $n_c$ is usually located in the surropunding or clad layer of the waveguide.

Propagation Constant—This is a constant found from a scalar wave equation descriptive of the electromagnetic fields which are supported by a particular waveguide geometry. An example of a scalar wave equation is found in "Optical and Quantum Electronics", J. P. Meunier et al., 15, (1983), pp. 77–85.

SUMMARY OF THE INVENTION

The novel optical component of this application meets the need for small, low cross talk, high performance WDMD devices by decreasing the distance between input or output waveguides and the phase shifting waveguide array. As described in U.S. patent application Ser. No. 08/586,134 cited above, the WDMD device comprises at least one input waveguide which transmits a multiplexed light signal, a phase shifting array of N waveguides which provides a distinct optical path length for light signals of different wavelengths, and an output array of M waveguides each of which transmits a single signal having a pre-selected wavelength. The number, N, of waveguides in the phase shifting array is equal to or greater than the number of wavelengths present in the multiplexed signal. That is, the integer N is in general much larger than the integer M. The greater the number of distinct paths in the phase shifting array, the better, in general, is the signal to noise ratio or crosstalk among the multiplexed or demultiplexed signals. The at least one input waveguide and the output array of waveguides are optically coupled to the respective first and second ends of the N waveguides of the phase shifting array. Although the terms input and output have been applied to the waveguides coupled to the phase shifting array, it will be understood that these waveguides may either transmit signals to or receive signals from the phase shifting array depending upon whether the WDMD is being used as a multiplexer (the phase shifting array receives a plurality of signal wavelengths from the M waveguide "output" array) or a demultiplexer (the phase shifting array receives multiplexed signals from the at least one "input" waveguide).

The spacing between the input or output waveguides and the phase shifting array depends upon the geometry of the waveguides of the WDMD. In addition, this spacing must be such as to satisfy the requirements:

the at least one input waveguide must distribute the multiplexed signal uniformly among the first ends of the N waveguide phase shifting array; and, each of the M waveguides of the output array must receive phase shifted signal light from each of the N waveguides of the phase shifting array. This spacing can be reduced by tapering the input or output waveguide end segments or by tapering the first or second ends of the phase shifting array. The reduction or decrease in spacing is in comparison to a WDMD device which has no tapered portion but is of the same general configuration as the novel WDMD.

A first aspect of the invention is a WDMD device in which the M waveguides of the output array are tapered at the ends which are coupled to the second ends of the phase shifting array. The direction of taper is such that the cross section of the output waveguides is smallest at the ends which are coupled to the phase shifting array. To prevent coupling of light among neighboring fibers in the output array, each fiber of the output array has a unique propagation constant.

In an embodiment of this first aspect, the M ends of the waveguides of the output array may be formed into a tapered segment in which the output array ends are arranged side by side in a plane and the spacing between adjacent waveguide centers is not greater than about 100 $\mu$m. In another, preferred embodiment, the end segments of the output array are arranged linearly in a plane, as above, and tapered to provide a spacing between centers of adjacent waveguides no greater than 30 $\mu$m.

A further embodiment of this first aspect includes either the first or second ends of the phase shifting array having a tapered portion. The taper is such that the smaller cross section of the tapered portion is nearest the input or the output waveguides.

The spacing between the at least one input waveguide and the phase shifting array can be decreased by tapering the end portion of the at least one input waveguide. As before, the small end of the tapered portion is nearest the phase shifting array.

The waveguides which make up the array may have unique propagation constants, but it will be understood that the novel WDMD device will function even if the phase shifting array members have the same propagation constant. In cases where the taper of the ends of the phase shifting array is large, a crosstalk requirement may dictate that the members of the phase shifter have distinct propagation constants. The difference in propagation constant among the members of an array is achieved by any of several means known in the art, for example, providing a different index $\Delta\%$, a different refractive index profile, or different core geometry for each member of the array. The design of the WDMD waveguide refractive index profiles includes those in which index increasing dopant materials or index decreasing dopants are used in the central portion or surrounding layer of the waveguide. In addition, embodiments of the novel WDMD include waveguides of planar or fiber type or hybrids of these two. The major considerations are size, cost and performance of the WDMD rather than type of waveguide used.

In order for the WDMD component to function properly, the coupling among the phase shifting array, the at least one input waveguide, and the output waveguide array must satisfy the conditions:

coupling between the input and the first ends of the phase shifting array must distribute light intensity from the input uniformly to the first ends; and, coupling between the output ends and the second ends of the phase shifting array must allow light from each second end to interfere at the output ends, thereby effectively delivering to each output end a single signal wavelength. These conditions on the coupling are stated for the demultiplexing function of the device. The reciprocal conditions, which must exist for the multiplexing function are:

coupling between output array ends and phase shifter second ends is such that light from each output array end is delivered substantially uniformly to the second ends; and, coupling between the phase shifter first ends and the at least one input fiber is such that essentially all the light emerging from the first ends is focussed upon the at least one input waveguide end.

The invention is also a method of making the WDMD device comprising the steps:

fabricating the phase shifting array;

providing coupling, as described above, between the input and output waveguides and the respective first and second ends of the phase shifting array, wherein the first or second ends of the phase shifting array, the end of the at least one input waveguide or the ends of the output waveguide array are tapered. The direction of larger to smaller taper is always directed toward an optical coupling. The taper can be formed by any of several methods known in the art including etching, ion exchange, or heating and precision stretching of the end portion to be tapered.

BRIEF DESCRIPTION OF THE DRAWINGS

FIG. 1a is an illustration of the functional elements of the WDMD having a tapered output array and input waveguide.

DETAILED DESCRIPTION OF THE INVENTION

Figure 1B:
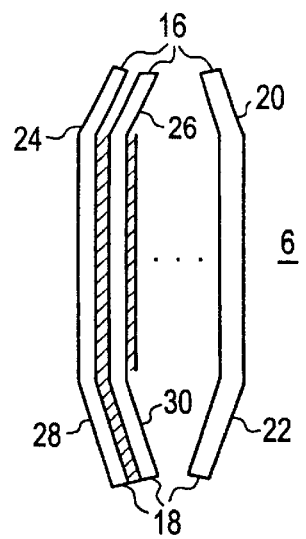
FIG. 1b is an illustration of the phase shifting array having first and second ends tapered.

The novel multiplexer/demultiplexer (WDMD) is characterized by one or more tapered waveguide portions located near the coupling regions of the device. The formation of the one or more tapered portions of the waveguides allows a reduction in spacing between the input or output waveguides and the phase shifting array in comparison to a similar WDMD having no tapered portions. A schematic illustration of a WDMD is given in FIG. 1a. A single input waveguide 2 carries M wavelength division multiplexed signals. The end 10 of input 2 is tapered so that a larger spot is incident on coupling element 4. Coupling element 4, which may be a cylindrical or planar graded index lens, distributes a uniform light intensity to the first ends 11 of phase shifting array 6. An index gradient may be formed in element 4 to provide equal intensity to first ends 11 even when the cross sectional areas of ends 11 are not equal. The phase shifting array 6 includes N waveguides 12 having a substantially uniform spacing 13. Because each of waveguides 12 of phase shifter 6 has a unique propagation constant, each wavelength in the multiplexed signal receives a unique phase shift as it passes through phase shifter 6. It is understood that the several alternative ways, known in the art, of introducing a unique phase shift to the respective waveguides of the phase shifter are effective to make the device functional. For example a unique phase shift can be introduced by varying the lengths of the respective waveguides of the phase shifter.

The focusing element 7 directs the phase shifted light wavelengths toward the output array 8 comprising M waveguides 14. As an alternative to the focusing element 7, ends 12 of the phase shifter may be arranged to perform the focussing function. For example, the ends 12 could be arranged along a curved line having the shape of a focussing lens. The down taper in the direction of the coupling region can be seen in output array 8. The light directed toward output array 8 interferes constructively and destructively due to the phase shift introduced in the phase shifter 6. Because each wavelength receives a unique phase shift, constructive interference will occur for a given wavelength at only one spatial location. The output array 8 is placed such that the end of one of waveguides 14 coincides with the location constructive interference of each signal wavelength, thereby effecting the demultiplexing of the signals. The taper in array 8 accounts for a reduced spacing between phase shifter 6 and output array 8. The down taper and the reduced inter-array spacing requires the ends of waveguides 14 to be closely spaced. To avoid cross coupling of signals between waveguides 14, especially in the tapered end portions, each of waveguides 14 has a unique propagation constant. Thus, the reduction in WDMD size is achieved without sacrificing signal separation.

An embodiment of the novel WDMD includes a phase shifter having tapered portions at one or both ends of its waveguides. A phase shifter 6 comprising tapered waveguide ends 16 and 18 is shown schematically in FIG. 1b. The tapered end portions of the phase shifter waveguides are labeled 20, 22, 24, 26, 28 and 30. As noted previously, the taper in the waveguides serves to reduce the size of the WDMD relative to a WDMD having no tapered waveguide ends. The number of phase shifting waveguides is equal to or greater than the number of wavelengths to be multiplexed. Through use of precision drawing techniques known in the art, the tapers in any of the waveguide end portions in the WDMD can be formed by heating and stretching or by any of several alternative techniques including direct deposit on a substrate, ion exchange, or etching.

Figure 2:
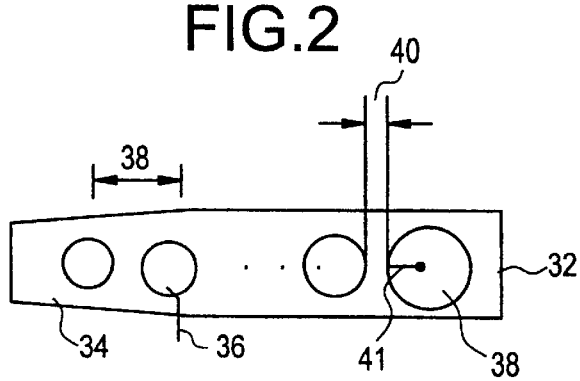
FIG. 2 shows the ends of a waveguide array in which the waveguides have a circular cross section.

To simplify the geometry of the WDMD, the spacing between waveguides in an array, 40 of FIG. 2, may be held substantially constant. Also the waveguides 34, 36, and 38 may have end faces which lie in a common plane and are arranged linearly. The embodiment of FIG. 2 shows the waveguides embedded in substrate 32 which can serve as the surrounding or cladding layer of the waveguides. The spacing between centers 38 may vary, particularly if the waveguides of the array differ in propagation constant due to differences in radius as illustrated by radius 41 of waveguide 38.

Figure 3:
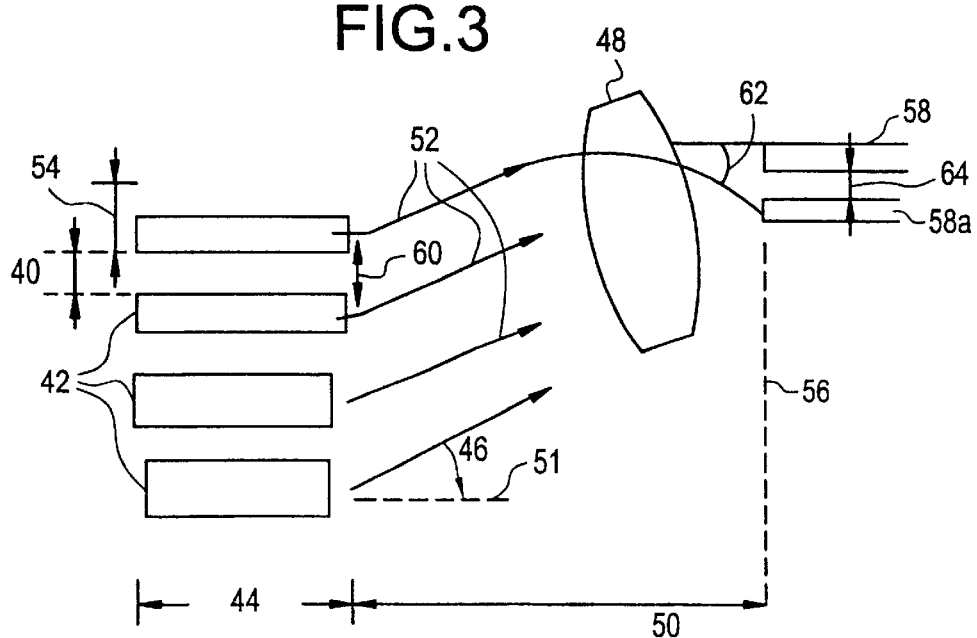
FIG. 3 is an illustration of the parameters used to estimate WDMD size.

The feasibility of the design may be deduced using FIG. 3. The phase shifting array waveguides 42 have a constant spacing between adjacent waveguides 40. The width dimension 54 of the waveguides is illustrated as being different for each waveguide to provide a unique propagation constant for each phase shifter waveguide 42. The length of the phase shifting array is shown as length 44. Light rays 52 emerging from the phase shifter array form an angle 46 with the optical axis 51. For a particular wavelength, $\lambda$, rays 52 constructively interfere at an output waveguide end 58 which is located a perpendicular distance 56 from the horizontal. Focusing element 48 directs rays 52 to the output waveguides exemplified by 58 and 58a.

A sample calculation may be made using the following parameters illustrated in FIG. 3. A tilted wavefront model or an interfering wave model may be used in describing this calculation. Referring to FIG. 3, light rays 52 emerge from the phase shifting array made up of waveguides 42. The spacing between waveguide centers, 60, is essentially constant. Rays 62 emerge from focussing element 48 and proceed to an output array exemplified by waveguides 58 and 58a. The WDMD device provides the requisite phase shift so that light of wavelength $\lambda_1$ is received by waveguide 58 and light of a different wavelength $\lambda_2$ is received by waveguide 58a. The angular dispersion is given by the ratio of the angular separation of rays 62, $\delta\theta$, to the difference $\lambda_{1-2}$, where the angle is formed by rays entering adjacent waveguides. Also, using the geometry of the WDMD device, $\delta\theta$ is equal to the ratio of optical path difference between adjacent rays 62 and the product of phase shifting waveguide center to center spacing D times $\lambda_1$. The optical path difference between adjacent rays may be expressed as $\delta\beta/k$, where $\beta$ is propagation constant and k is wavenumber. Then the equation for angular dispersion becomes $(\delta\beta \times L)/(2\pi D)$. In a similar manner, one finds the linear dispersion $=\delta x/(\lambda_1-\lambda_2)=(f \times \delta\beta L)/(2\pi D)$, where $\delta x$ is output waveguide spacing 64 and f is distance 50 between the phase shifting array and the output array.

Let $f=5\times10^4$ $\mu$m, $\delta\beta=0.001$ $\mu$m$^{-1}$, $L=10^4$ $\mu$m, and $D=10$ $\mu$m. Then the linear dispersion is calculated to be 8 $\mu$m/nm. Note the excellent linear separation of wavelengths for WDMD geometrical parameters which may reasonably be achieved by an artisan.

Although various embodiments of the invention have hereinbefore been disclosed and described the invention is nonetheless limited only by the following claims.

We claim:

1. An optical waveguide component for reciprocal multiplexing and demultiplexing by wavelength division, described for signals propagating in the direction in which demultiplexing occurs, comprising:

a phase shifting array of N waveguides, which propagate M multiplexed signal wavelengths, each signal having an intensity and a phase, and each of the N waveguides of said phase shifting array having a first and a second end, and a propagation constant different from the propagation constant of every other waveguide of said phase shifting array to provide a unique phase shift for each signal wavelength, wherein N>M;

at least one input waveguide, for propagating the M multiplexed signal wavelengths, optically coupled to the first end of each of the N waveguides of said phase shifting array, to provide uniform signal intensity distribution to the N waveguides of said phase shifting array; and, an output array of M waveguides, each of the M waveguides of said output array having an end which is optically coupled to the second ends of the N waveguides of said phase shifting array, and the phase shifted signals exiting said phase shifting array interfere so that each of the M waveguides of said output array receives a single signal wavelength from said phase shifting array;

wherein the M waveguides of said output array each have a propagation constant different from the propagation constant of every other waveguide in said output array, at least over a portion of the lengths of said output array beginning nearest the ends coupled to the second end of said phase shifting array, to prevent cross coupling of demultiplexed signals among said M waveguides of the output array.

2. The optical component of claim 1 wherein the ends of the M waveguides of said output array, which are optically coupled to said phase shifting array, are grouped to form an end segment which tapers inwardly toward said phase shifting array such that the distance between adjacent waveguide centers is no greater than 100 $\mu$m, and the propagation constants of the M waveguides of the output array are different at least over a length which includes the tapered end segment.

3. The optical component of claim 2 wherein the distance between adjacent waveguide centers is no greater than 30 $\mu$m.

4. The optical component of either claim 1 or claim 2 wherein either the first or second ends of said phase shifting array are grouped to form a respective end segment which tapers inwardly toward said at least one input waveguide or toward said output array.

5. The optical component of claim 1 wherein said at least one input waveguide has an end segment which tapers inwardly toward the first ends of said phase shifting array which broadens the signal light emerging from said at least one input waveguide to provide a coupling distance between said at least one input waveguide and the first ends of said phase shifting array which is less than the coupling distance between an untapered input waveguide and the phase shifting array.

6. The optical component of claim 1 wherein each waveguide of said output array of waveguides comprises: a core region having a width dimension, a refractive index $\Delta\%$, and a refractive index profile, and a clad layer, having an index of refraction, surrounding and in contact with the core region, wherein the waveguide characteristics which provide a unique propagation constant for each of the N waveguides of said output array are chosen from the group consisting of refractive index $\Delta\%$, core width, and core refractive index profile.

7. The optical component of claim 6 wherein the clad refractive index is less than the refractive index of silica.

8. The optical component of claim 1 wherein said phase shifting array, said at least one input waveguide, and said output array are selected from a group of waveguide types consisting of a planar waveguide and an optical fiber waveguide.

9. The optical component of claim 1 wherein said optical coupling between said at least one input waveguide and said phase shifting array includes means for uniformly distributing the input signal intensities over the first ends of said phase shifting array.

10. The optical component of claim 1 wherein said optical coupling between the second ends of said phase shifting array and the ends said output array include means for uniformly distributing the light from each second end of said phase shifting array to the ends of said output array.

11. The optical component of claim 10 in which the means for uniformly distributing the light comprises an arrangement of the second ends of the phase shifting array along a pre-selected arc.

12. A method of making an optical waveguide component for reciprocal multiplexing and demultiplexing by wavelength division, comprising the steps:

a) fabricating a phase shifting array of N waveguides wherein each waveguide of said array has a unique propagation constant to produce a wavelength dependent phase shift in signals passing therethrough, said phase shifting array having a first and a second end and a cross sectional area;

b) optically coupling at least one input waveguide, having a cross sectional area, to the first end of said phase shifting array, for transmitting or receiving multiplexed signals to or from said waveguide array;

c) optically coupling an output array of M waveguides, wherein N>M, each waveguide having a cross sectional area, to the second ends of said phase shifting array for transmitting signals of different wavelength to said phase shifting array for multiplexing or receiving demultiplexed signals from said phase shifting array;

d) forming in at least one of the first or second ends of said phase shifting array, the ends of said output array coupled to said phase shifting array, and the at least one input waveguide coupled to said phase shifting array, a tapered length wherein the taper is from a larger to a smaller cross sectional area, the smaller cross sectional area located nearest the coupled ends.

13. The method of claim 12 wherein step b) includes the step of inserting an optical element between said phase shifting array and said at least one input waveguide to provide uniform transfer of multiplexed signals from said at least one input waveguide to the first ends of said phase shifting array or efficient transfer of multiplexed signals from said shifting array to said at least one input waveguide.

14. The method of claim 12 wherein step c) includes the step of inserting an optical element between said phase shifting array and said output array to provide uniform transfer of multiplexed signals from said phase shifting array to said output array or uniform transmission of a signal from each waveguide of said output array to every to every second end of said phase shifting array.

15. The method of claim 12 wherein step d) further includes a substep selected from the group consisting of etching, ion exchange, and heating and precision stretching.

16. The method of claim 12 wherein step d) includes the step of arranging the second ends of the phase shifting array along a pre-selected arc to provide uniform transfer of multiplexed signals from said phase shifting array to said output array or uniform transfer of a signal from each waveguide of said output array to every second end of said phase shifting array.

* * * * *